(No Model.)
W. B. FROST.
HARNESS CHECK.
No. 324,765. Patented Aug. 18, 1885.
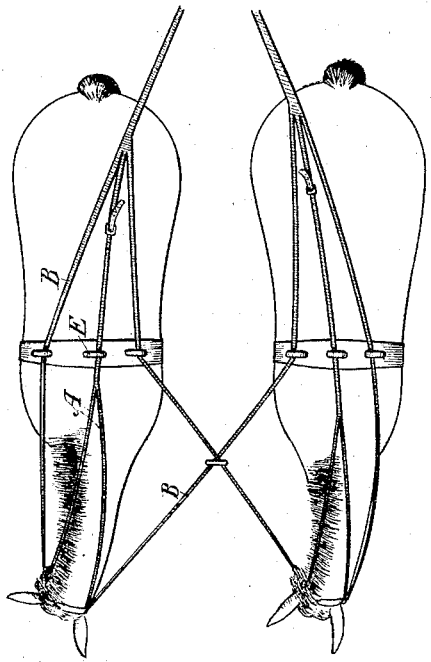
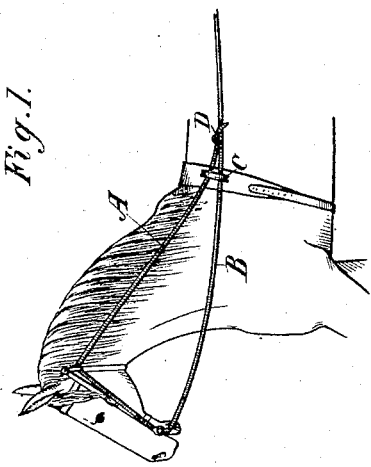
Witnesses
Geo. H. Strong.
J. H. Rouse.
Inventor,
Wm. B. Frost
By
Dewey & Co.
Attorneys

UNITED STATES PATENT OFFICE.

WILLIAM B. FROST, OF SAN FRANCISCO, CALIFORNIA, ASSIGNOR OF ONE-HALF TO GEORGE S. INGERSOLL, OF SAME PLACE.

HARNESS-CHECK.

SPECIFICATION forming part of Letters Patent No. 324,765, dated August 18, 1885.

Application filed June 8, 1885. (No model.)

*To all whom it may concern:*

Be it known that I, WILLIAM B. FROST, of the city and county of San Francisco, State of California, have invented an Improvement in Harness-Checks; and I hereby declare the following to be a full, clear, and exact description of the same.

My invention relates to certain improvements in harness-checks for horses; and it consists of a check-rein of either the form known as "side" or "over" check attached to the bit, passing through the usual guides or runners, and thence to a point where it is attached to the reins by which the horse or horses are driven, and an independent guide or terret.

Referring to the accompanying drawings for a more complete explanation of my invention, Figure 1 is a view showing my check-rein and its connection in single harness. Fig. 2 shows its application to double harness.

A is the check-rein, and B the driving-reins, of a harness, both being attached or connected with the bit in any of the usual ways. The driving-reins pass through the terrets C extending back to the driver. The check-reins may pass through runners at the sides of the horse's head, or it may be of the form known as "overcheck," which passes over the top of the horse's head. From this point it passes downward and backward leading through the terret beside the rein, and it is attached to the rein at the point D by a buckle or other fastening, so that its length may be adjusted to suit the required position of the horse's head and the manner in which the reins are used in single harness.

If the horse has a hard mouth and it is necessary to keep the reins tight, the adjustment will be such that the horse's head will be at the proper altitude when the reins are in position to properly drive the animal; but if the horse has an easy mouth and drives without a very tight rein the check may be adjusted so as to hold the head properly when the reins are used in this manner.

When applied to double harness, the check-rein passes through an independent ring or terret, E, on the top of the saddle, and extends back so as to connect with the driving-rein, as shown in Fig. 2.

Having thus described my invention, what I claim as new, and desire to secure by Letters Patent, is—

A harness-check leading upward and backward from the bit through guides or runners, in combination with the independent terret or guide E, and the driving-reins, to which it is united at the rear of the terret or guide, all substantially as herein described.

In witness whereof I have hereunto set my hand.

WILLIAM B. FROST.

Witnesses:
S. H. NOURSE,
H. C. LEE.